UNITED STATES PATENT OFFICE.

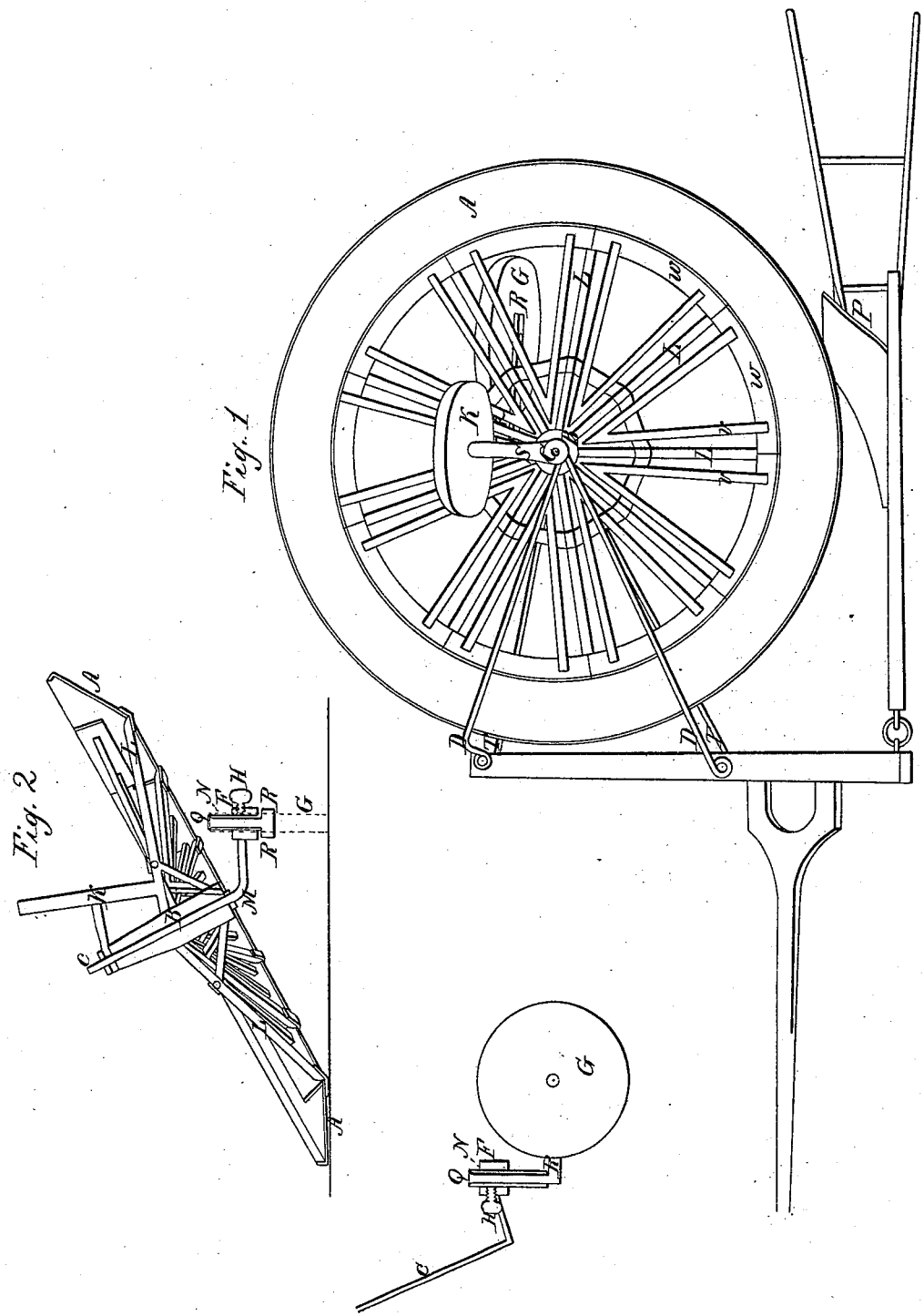

D. C. LOCKWOOD, OF NEW WINDSOR, NEW YORK.

MACHINE FOR EXCAVATING EARTH.

Specification of Letters Patent No. 2,025, dated March 31, 1841.

*To all whom it may concern:*

Be it known that I, DAVID C. LOCKWOOD, of the town of New Windsor and county of Orange, in the State of New York, have invented a new and useful Machine for Excavating Earth, which is described as follows, reference being had to the annexed drawing of the same, making part of this specification.

The wheel which is shown at Figure 1 (the periphery of which is marked A) is an inclined wheel of about 12 feet in diameter; it is supported at an angle of about 30 degrees from the plane of the horizon as seen in Fig. 2 by the supporting wheel G. This large wheel which is termed the inclined wheel and marked A has a long hub B into which its spokes are inserted. The spokes L are not inserted into the hub of the inclined wheel at right angles but they are depressed at their outer ends and rise toward the hub so that they are placed into the hub at an angle of about 20 degrees from the plane of the wheel as seen in Fig. 2. By having the spokes elevated at their inner ends as aforesaid, it gives more room for a cart to come under the inclined wheel, the spokes may also be more easily fastened by having braces under them when placed in the aforesaid way. The hub of this wheel extends far enough below the spokes to admit of braces being extended from the hub to about the middle of each of the spokes.

The iron bar C that constitutes the axle of the inclined wheel extends sufficiently far beyond the upper extremity of its hub to receive the braces D that constitute a part of the fixtures for drawing the machine. The axle C has a collar M upon it at the lower extremity of the hub upon which the lower end of the hub bears. Immediately below this collar the axle is bent up so as to extend outward nearly horizontally as seen in Fig. 2. The extremity of this extended axle then becomes bulbous as at F. Its bulb F is perforated perpendicularly to the horizon, and to the eye thus formed is fitted a tube N 2 or 3 feet long into which is inserted a spindle Q which plays in the tube, this perpendicular spindle is fastened at its lower end to two horizontal parallel crotch shaped bars R between which the perpendicular supporting wheel G is hung. A screw H is inserted into the bulb for the purpose of holding the forementioned tube, in any required position so that the inclined wheel may be elevated or depressed at pleasure. The support wheel G which is connected with the inclined wheel by the forementioned fixture is about equal in size to a common cart wheel, and revolves under the inclined wheel at a sufficient distance from the periphery of the inclined wheel to admit a cart under the inclined wheel, so that the dirt may fall from the periphery into the carts. The periphery of the inclined wheel should be 1½ feet wide and be left smooth on the top by having the iron ends of the spokes fastened under it. The periphery is beveled at an angel of about 25 degrees from the plane of the wheel, the advantages of its being beveled are that the lowest part of the periphery (which is next the plough) is thereby made nearly level while the highest part of the periphery (where the dirt is let off) is rendered thereby steep, so that the dirt falls off readily.

The plow P is to be managed by a man; the plow should be so constructed as to raise the dirt more before it begins to turn it over than a common plow; the plow is to work adjacent to the part of the periphery of the inclined wheel that is in contact with the earth so that it may turn the furrow over upon the periphery; by the revolution of which the earth is conveyed to an elevation sufficient to be dropped into a cart that moves along under the highest part of the wheel as previously mentioned. The horse and cart is to move along at the same rate as the team that draws the machine and plow. A pole may be extended from the main beam of the drawing apparatus of the machine to which the horse that draws the cart may be attached when found necessary.

To prevent the earth from escaping from the periphery while being conveyed to the requisite elevation, the following fixture is employed. At about one third of the distance from center of the inclined wheel to its periphery cross shafts or rollers are extended from radius to radius between all the radii or spokes of the inclined wheel, across those shafts or rollers the lifting bars V are extended, and reaching from near the hub of the inclined wheel to its periphery. To the outer extremity of each of the lifting bars V is attached a stopboard W; some times two lifting bars may be fastened triangularly across one roller in that case both lifting bars lift one stopboard, each end of the stop board being fastened to the outer end of each of the lifting bars.

The stop boards when down form a circular curb 6 or 8 in. high all around the machine on the inner edge of its periphery, thus securing the earth that is being elevated until it has arrived at a proper elevation for being dropped into the cart; where the following apparatus is employed for effecting its escape. A wheel K termed the lifting wheel is supported above the inner end of the lifting bars by a shaft S extended from the main axletree of the inclined wheel. The lifting wheel is hung upon the foresaid shaft so that when the inclined wheel revolves the spokes of the said inclined wheel may run under the lifting wheel without touching it, while the lifting bars which are higher than the spokes, as they come to the lifting wheel, they are borne down by it, (by running under it,) which causes their outer ends to raise up they being levers having the foresaid rollers for their fulcrums. This lifting should be stationed, when the machine is loading carts, above the hub of and the highest part of the inclined wheel so that it may lift the stopboard W highest in the wheel. But for other work where it would be convenient to have the dirt let off before it has gone so far, the lifting wheel may be stationed at any required position so as to let the dirt off when it has arrived at the desired place.

The following fixture is employed for drawing the machine. Before the inclined wheel is stationed a beam or bar termed the cross beam, one extremity of this cross beam extends so far that it is nearly opposite the hub of the inclined wheel, and the other so far that it is opposite the plow; with this extremity the plow P is connected, by a chain. From extremities of this cross beam braces D T extend to both extremities of the axle of the inclined wheel. To this cross beam is attached a tongue or shafts for drawing the machine.

Occasionally it is important that a machine should have a drawing apparatus on each side of the inclined wheel, so that on the side of a hill it may be moved in opposite directions without being turned about; when the machine is worked in this way two plows should be used one of them with the mold board on the right and the other on the left, or else a plow with a revolving moldboard. When two plows are used one of them will be carried while the other is plowing and so alternately. The plow which is being carried may be put upon the end of the cross beam that is next the land that is being plowed, which will sometimes be advantageous by its increasing the pressure of the inclined wheel upon the ground and thereby preventing it from slipping.

The drawing apparatus on one side of the machine may be permanently fastened on, but that on the other side should be made so as to lock and unlock at pleasure. A machine that is intended to have but one fixture on one side, for drawing the machine, may have its supporting wheel hung in range of the horizontal part of the main axletree; but for working every way it is better to have the supporting wheel to come under the side of the inclined wheel that is loaded with earth, that so the inclined wheel may not tip up when there is a drawing apparatus on each side of the machine; it is for this purpose that the tube and spindle is used so that the support wheel may swing around on the machines being drawn back and forward and so keep the support wheel constantly under the loaded part of the inclined wheel.

What I claim as my invention and desire to secure by Letters Patent is—

1. The described mode of letting the dirt off from the wheel by lifting the stopboards which form the inner curb of the periphery.

2. And also the described arrangement by which the supporting wheel is brought within the inner edge of the upper part of the periphery of the inclined wheel so as to allow a cart &c. to receive the earth directly from the emptying stopboards.

DAVID C. LOCKWOOD.

Witnesses:
C. F. BELKNAP,
J. CROWELL, Jr.